(12) United States Patent
Liu et al.

(10) Patent No.: US 11,698,786 B2
(45) Date of Patent: Jul. 11, 2023

(54) PROCESSING APPARATUS AND PROCESSING METHOD

(71) Applicant: Shanghai Cambricon Information Technology Co., Ltd., Pudong New Area (CN)

(72) Inventors: Shaoli Liu, Pudong New Area (CN); Wei Li, Pudong New Area (CN); Tian Zhi, Pudong New Area (CN); Tianshi Chen, Pudong New Area (CN)

(73) Assignee: SHANGHAI CAMBRICON INFORMATION TECHNOLOGY CO., LTD, Shanghai (CN)

(*) Notice: Subject to any disclaimer, the term of this patent is extended or adjusted under 35 U.S.C. 154(b) by 675 days.

(21) Appl. No.: 16/697,727

(22) Filed: Nov. 27, 2019

(65) Prior Publication Data
US 2020/0097795 A1     Mar. 26, 2020

Related U.S. Application Data

(63) Continuation of application No. 16/476,262, filed as application No. PCT/CN2018/083415 on Apr. 17, 2018, now Pat. No. 11,531,540.

(30) Foreign Application Priority Data

Apr. 21, 2017 (CN) .......................... 201811097653.0

(51) Int. Cl.
*G06F 9/00* (2006.01)
*G06F 9/30* (2018.01)
(Continued)

(52) U.S. Cl.
CPC .................. *G06F 9/30* (2013.01); *G06F 7/46* (2013.01); *G06F 9/30007* (2013.01); *G06N 3/04* (2013.01); *G06N 3/08* (2013.01)

(58) Field of Classification Search
None
See application file for complete search history.

(56) References Cited

U.S. PATENT DOCUMENTS 5,086,479 A * 2/1992 Takenaga ............. G06N 3/0454
706/20
5,297,237 A * 3/1994 Masuoka ................. G06N 3/08
706/25

(Continued)

FOREIGN PATENT DOCUMENTS

CN      101038681 A      9/2007
CN      101527010 A      9/2009
(Continued)

OTHER PUBLICATIONS

JP 2019-549467 Notice of Reason for Refusal, dated Jan. 19, 2021, 14 pages, (with English translation).
(Continued)

*Primary Examiner* — Martin Mushambo
(74) *Attorney, Agent, or Firm* — Getech Law LLC; Jun Ye

(57) ABSTRACT

The present disclosure provides a computation device and method. The device may include an input module configured to acquire input data; a model generation module configured to construct an offline model according to an input network structure and weight data; a neural network operation module configured to generate a computation instruction based on the offline model and cache the computation instruction, and compute the data to be processed based on the computation instruction to obtain a computation result; and an output module configured to output a computation result. The device and method may avoid the overhead caused by running an entire software architecture, which is a problem in a traditional method.

14 Claims, 3 Drawing Sheets

(51) Int. Cl.
*G06N 3/04* (2023.01)
*G06N 3/08* (2023.01)
*G06F 7/46* (2006.01)

(56) References Cited

U.S. PATENT DOCUMENTS

| | | | | |
|---|---|---|---|---|
| 6,049,793 | A * | 4/2000 | Tomita | G06K 9/6281 |
| | | | | 706/20 |
| 6,601,051 | B1 * | 7/2003 | Lo | G06N 3/084 |
| | | | | 706/30 |
| 9,189,200 | B1 | 11/2015 | Langhammer | |
| 10,365,340 | B1 * | 7/2019 | Lou | A61B 5/055 |
| 2005/0131790 | A1 * | 6/2005 | Benzschawel | G06N 3/02 |
| | | | | 705/35 |
| 2005/0257026 | A1 | 11/2005 | Meeker | |
| 2007/0022075 | A1 * | 1/2007 | Horvitz | G06F 8/36 |
| | | | | 706/52 |
| 2007/0239633 | A1 * | 10/2007 | Dietrich | G06N 3/02 |
| | | | | 706/15 |
| 2009/0187445 | A1 * | 7/2009 | Barclay | G06Q 50/06 |
| | | | | 702/60 |
| 2009/0271465 | A1 | 10/2009 | Pistorius et al. | |
| 2011/0055308 | A1 | 3/2011 | Mantor et al. | |
| 2011/0313578 | A1 * | 12/2011 | Jones | G06F 30/20 |
| | | | | 700/291 |
| 2014/0164457 | A1 | 6/2014 | Chaudhuri | |
| 2014/0208081 | A1 * | 7/2014 | Yap | G06F 8/34 |
| | | | | 712/227 |
| 2014/0278379 | A1 * | 9/2014 | Coccaro | G10L 15/1822 |
| | | | | 704/202 |
| 2015/0006444 | A1 * | 1/2015 | Tamatsu | G06N 3/082 |
| | | | | 706/12 |
| 2015/0046671 | A1 | 2/2015 | Ould-Ahmed-Vall | |
| 2015/0088795 | A1 * | 3/2015 | Golovashkin | G06N 3/08 |
| | | | | 706/21 |
| 2015/0248608 | A1 * | 9/2015 | Higgins | G06N 3/08 |
| | | | | 706/16 |
| 2016/0328647 | A1 | 11/2016 | Lin et al. | |
| 2017/0102920 | A1 | 4/2017 | Henry et al. | |
| 2017/0180276 | A1 * | 6/2017 | Gershony | H04L 51/222 |
| 2018/0032856 | A1 * | 2/2018 | Alvarez-Icaza | G06N 3/049 |
| 2018/0150444 | A1 * | 5/2018 | Kasina | G06F 16/4393 |
| 2018/0166066 | A1 * | 6/2018 | Dimitriadis | G10L 25/78 |
| 2018/0166067 | A1 * | 6/2018 | Dimitriadis | G10L 15/04 |
| 2018/0174036 | A1 * | 6/2018 | Han | G06N 3/063 |
| 2018/0225553 | A1 * | 8/2018 | Ha | G06F 16/355 |
| 2018/0268298 | A1 * | 9/2018 | Johansen | G06V 10/764 |
| 2018/0314942 | A1 * | 11/2018 | Shinn | G06N 3/08 |
| 2018/0314963 | A1 * | 11/2018 | Kovács | G06N 3/08 |
| 2019/0107405 | A1 * | 4/2019 | Wang | G01C 21/20 |
| 2019/0130248 | A1 * | 5/2019 | Zhong | G06F 16/93 |
| 2019/0138267 | A1 * | 5/2019 | Mailey | G06F 40/35 |
| 2019/0295536 | A1 * | 9/2019 | Sapugay | G10L 15/19 |
| 2019/0311245 | A1 * | 10/2019 | Zhang | G06N 3/105 |
| 2020/0302162 | A1 * | 9/2020 | Lin | G06V 10/764 |
| 2021/0150685 | A1 * | 5/2021 | Chen | G06T 3/4046 |

FOREIGN PATENT DOCUMENTS

| | | | |
|---|---|---|---|
| CN | 101571796 | A | 11/2009 |
| CN | 101599828 | A | 12/2009 |
| CN | 101685388 | A | 3/2010 |
| CN | 103699360 | A | 4/2014 |
| CN | 104011657 | A | 8/2014 |
| CN | 104699458 | A | 6/2015 |
| CN | 105005911 | A | 10/2015 |
| CN | 105207794 | A | 12/2015 |
| CN | 105359129 | A | 2/2016 |
| CN | 105426160 | A | 3/2016 |
| CN | 105453071 | A | 3/2016 |
| CN | 105512723 | A | 4/2016 |
| CN | 106066783 | A | 11/2016 |
| CN | 106447034 | A | 2/2017 |
| CN | 106528047 | A | 3/2017 |
| EP | 0428942 | A2 | 5/1991 |
| EP | 0428942 | A3 | 5/1991 |

OTHER PUBLICATIONS

CN 201710264686.9—Second Office Action, dated Dec. 23, 2020, 10 pages, (no English translation).
CN 201710264686.9—Third Office Action, dated Mar. 18, 2021, 12 pages, (no English translation).
Xu Jianbang, et.al, "National Defense Industry Press", DSP Algorithm and Architecture Realization Technology, Jan. 31, 2010, 4 pages. (no English translation).
CN 201710256445.X—First Office Action, dated Sep. 25, 2020, 10 pages (no English translation).
Tao Wang, et al., "The Study and Realization of Instruction Folding in Java Processor", Computer Research and Development, vol. 37 No. 1, Jan. 31, 2000, 5 pages. (with English abstract).
Yigang Zhang, "Harbin Institute of Technology Press" MCS-51 Singer Chip Microcomputer Application Design, 2nd Edition, Dec. 31, 1997, 3 pages. (no English translation).
CN 201710269049.0—First Office Action, dated May 15, 2020, 7 pages. (no English translation).
CN 201710269106.5—Second Office Action, dated Nov. 3, 2020, 5 pages. (no English translation).
CN 201711468817.1—First Office Action, dated Dec. 8, 2020, 8 pages. (no English translation).
CN 201811097569.9—First Office Action, dated Aug. 3, 2020, 11 pages. (no English translation).
EP 18788355.8—Extended European Search Report, dated Jan. 22, 2021, 8 pages.
EP 18788355.8—Response to the Communication under Rules 161 and 162 EPC dated Nov. 26, 2019, filed Feb. 4, 2020, 18 pages.
Taesik Na, et al., "Speeding up Convolutional Neural Network Training with Dynamic precision Scaling and Flexible Mlultiplier-Accumulator", ISLPED, Aug. 2016, 6 pages.
KR 10-2019-7025307—Response to Office Action, filed Feb. 9, 2021, 22 pages. (no English translation).
KR 10-2019-7025307—Office Action, dated Dec. 28, 2020, 3 pages. (no English translation).
JP 2019-228383—First Office Action, 2019, 5 pages. (no English translation).
EP 19214371.7—Extended European Search Report, dated Jan. 25, 2021, 9 pages.
EP 19214320.4, European Search Report dated Mar. 24, 2020, 8 pages.
CN 201710264686.9, Official Action dated Apr. 17, 2020, 11 pages. (No English Translation).
CN 201710269106.5, Official Action dated Mar. 26, 2020, 11 pages. (No English Translation).
CN 201811097653.0, Official Action dated Apr. 30, 2020, 8 pages, (No English Translation).
Article 296-302 "Binary Number Multiplier" 2020, 19 pages (11 pages of Translation, 8 pages of Article).
PCT/CN2018/083415—International Search Report, dated Jul. 20, 2018, 10 pages. (no English translation).
EP 19 214 320.4, Communication pursuant to Article 94(3), 6 pages.
CN201880000923.3—Office Action dated Mar. 31, 2023, 25 pages. (With Brief English Explanation).

* cited by examiner

PROCESSING APPARATUS AND PROCESSING METHOD

TECHNICAL FIELD

The present disclosure relates to the field of computer, and further relates to a computation device and method of artificial intelligence.

BACKGROUND

With the advent of the era of big data, neural network algorithms have become a research hotspot in the field of artificial intelligence in recent years, and have been widely used in pattern recognition, image analysis, and intelligent robots.

Deep learning is a method in machine learning based on learning data representations. Observation values (e.g., an image) can be represented in a variety of ways, such as a vector of the intensity value of each pixel, or more abstractly represented as a series of edges, regions of particular shapes, and the like. Using certain representation methods makes it easier to learn humans as the objects from the instances (e.g., face recognition or facial expression recognition).

So far, several deep learning architectures, such as deep neural network, convolutional neural network and deep belief network and recurrent neural network, have been applied in the fields of computer vision, speech recognition, natural language processing, audio recognition and bioinformatics, and have achieved excellent results. In addition, deep learning has become a term to some extent, or a rebranding of neural network.

As deep learning (neural network) becomes popular, neural network accelerators have emerged. By specialized memory and operation module design, the neural network accelerator can obtain dozens of times or even hundreds of times of the speedup ratio in the deep learning operation than the general-purpose processor, and the area of the accelerator is smaller and the power consumption is lower.

SUMMARY

(I) Technical Problem to be Solved

In view of the problems above, a purpose of the present disclosure is to provide a computation method and device for overcoming at least one of the technical problems.

(II) Technical Solutions

The present disclosure provides a computation device including: an input module configured to acquire input data, where the input data may include data to be processed, a network structure, and weight data, or the input data may include data to be processed and/or offline model data; a model generation module configured to construct an offline model according to the input network structure and weight data; a neural network operation module configured to generate a computation instruction according to the offline model and cache the computation instruction, and compute the data to be processed based on the computation instruction to obtain a computation result; an output module configured to output the computation result; and a control module configured to detect a type of the input data and control the input module, the model generation module, and the neural network operation module to perform computation.

The control module may perform the following operation:

in the case where input data includes data to be processed, a network structure, and weight data, controlling the input module to input the network structure and the weight data into the model generation module to construct an offline model, and controlling the neural network operation module to perform computation on the data to be processed input by the input module according to the offline model input by the model generation module;

in the case where the input data includes data to be processed and an offline model, controlling the input module to input the data to be processed and the offline model into the neural network operation module, and controlling the neural network operation module to generate a computation instruction according to the offline model and cache the computation instruction, and to perform computation on the data to be processed according to the computation instruction, and in the case where the input data includes only data to be processed, controlling the input module to input the data to be processed into the neural network operation module, and controlling the neural network operation module to call a cached computation instruction and perform computation on the data to be processed.

In an further example, the neural network operation module may include a model parsing unit configured to generate a computation instruction according to an offline model; and a neural network processor configured to cache the computation instruction for subsequent computation to call, or call a cached computation instruction in case where only the data to be processed is included in the input data, and perform computation on the data to be processed according to the computation instruction to obtain a computation result.

In a further example, the neural network operation module may further include an instruction caching unit (cache, buffer, or scratch pad) for writing a received computation instruction for the neural network processor to call; and a data caching unit (cache, buffer, or scratch pad) for writing the input data.

In a further example, the network structure is a neural network structure including at least one of the following: AlexNet, GoogleNet, ResNet, VGG, R-CNN, GAN, LSTM, RNN, and ResNe.

In a further example, the offline model is a neural network model, and the neural network model includes at least one of the following: Cambricon_model, AlexNet_model, GoogleNet_model, VGG_model, R-CNN_model, GAN_model, LSTM_model, RNN_model, and ResNet_model.

The present disclosure further provides a computation method using the aforesaid computation device including the following steps:

acquiring input data;

acquiring an offline model, or determining an offline model according to the input data, and determining a computation instruction according to the offline model for subsequent computation to call; and calling the computation instruction, performing computation on data to be processed, and obtaining a computation result for outputting.

In a further example, the input data may include data to be processed, a network structure, and weight data, or the input data may include data to be processed and/or offline model data.

In a further example, the offline model is already existing, or is post-constructed according to the input data.

In a further example, the calling the computation instruction may include: performing network operation according to the computation instruction in the case that the input data only includes data to be processed and does not include an offline model, or, performing network operation according to the computation instruction in case data of an offline model is determined.

In a further example, when the input data includes data to be processed, a network structure, and weight data, the determining an offline model according to the input data includes: constructing the offline model according to the network structure and the weight data.

In a further example, the network structure is a neural network structure including at least one of the following: AlexNet, GoogleNet, ResNet, VGG, R-CNN, GAN, LSTM, RNN, and ResNe.

In a further example, the offline model is a neural network model, and the neural network model includes at least one of the following: Cambricon_model, AlexNet_model, GoogleNet_model, VGG_model, R-CNN_model, GAN_model, LSTM_model, RNN_model, and ResNet_model.

Another aspect of the present discourse provides an electronic apparatus including the computation device of any of the examples above.

(III) Technical Effects

The computation method and device may have the following technical effects:

1. the computation method and device may perform computation directly according to an offline model after generating the offline model, which may thereby avoid the overhead caused by running an entire software architecture including a deep learning framework;

2. the computation method and device may effectively reconstruct the functions of a neural network processor, which may thereby enable full performance and a more concise and fast computation process in a low-memory application environment with strong real-timeness.

DETAILED DESCRIPTION

The technical solutions in the examples of the present disclosure are clearly and completely described below with reference to the drawings in the examples of the present disclosure. Apparently, the described examples are only a part of the examples of the present disclosure, rather than all of the examples. All other examples obtained by a person of ordinary skill in the art based on the examples of the present disclosure without creative efforts are within the scope of the present disclosure.

The present disclosure provides a computation method and a computation device including constructing an offline model. After an offline model is generated, computation can be performed directly according to the offline model, which may thereby avoid overhead caused by running an entire software architecture including a deep learning framework.

The present disclosure will be specifically described below in combination with specific examples.

Figure 1:
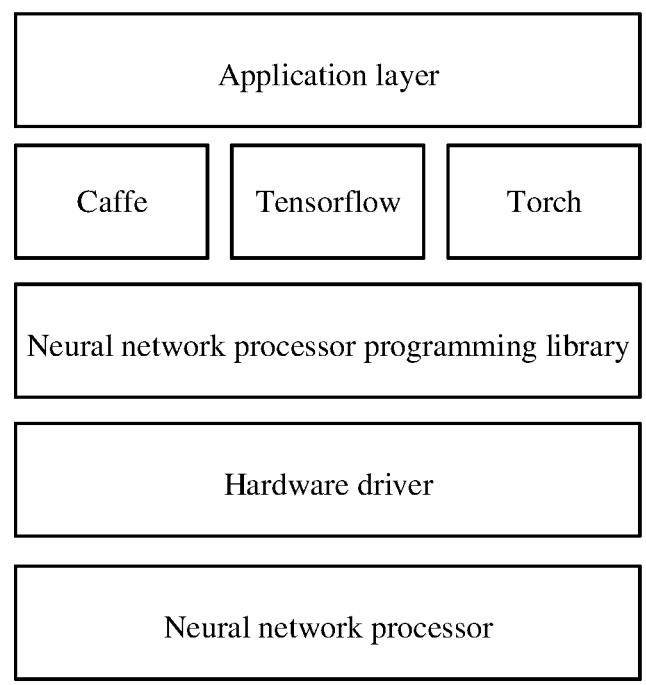
FIG. 1 is a diagram of a typical programming framework.

In typical application scenarios, a neural network accelerator programming framework is usually at a topmost layer, and the programming framework can be Caffe, Tensorflow, Torch, etc. As shown in FIG. 1, from a bottom layer to a top layer are a neural network processor (special-hardware for neural network operations), a hardware driver (for software calling the neural network processor), a neural network processor programming library (for providing an interface to call the neural network processor), a neural network processor programming framework, and an advanced application requiring neural network operations.

An aspect of an example of the present disclosure provides a computation method for a neural network, which may include the following steps:

step 1: acquiring input data;

step 2: acquiring an offline model or determining an offline model according to the input data, and determining a computation instruction according to the offline model for subsequent computation to call; and step 3: calling the computation instruction, and operating the data to be processed to obtain a computation result for outputting.

The input data may include data to be processed, a network structure, and weight data, or the input data may include data to be processed and/or offline model data.

The offline model in step 2 may be existing, or post-constructed according to external data (such as a network structure or weight data). A manner of obtaining the computation instruction by setting an offline model may improve a computation process.

The calling the computation instruction in step 3 may be that the network operation is performed only according to the computation instruction, in the case that the input data includes only the data to be processed and does not include the offline model or the data is used to determine the offline model.

In some examples, when the input data includes data to be processed, network structure, and weight data, the following steps may be executed:

step 11: obtaining input data;

step 12: construct an offline model according to the network structure and the weight data;

step 13: parsing the offline model, obtaining and caching a computation instruction for subsequent calculation call;

step 14: performing computation on the data to be processed according to the computation instruction to obtain a computation result for output.

In the example above, the offline model is first constructed according to the network structure and the weight data, and then the offline model polarity is parsed to obtain the computation instruction, which enables full performance and more concise and fast computation process in a low-memory and real-time application environment where no offline model is stored.

In some examples, when the input data includes data to be processed and an offline model, the following steps are executed:

step 21: obtaining input data;

step 22: parsing the offline model, obtaining a computation instruction and caching the computation instruction for subsequent computation to call; and step 23: performing computation on the data to be processed according to the computation instruction to obtain a computation result for outputting.

In the above-mentioned example, when the input data includes the offline model, after the offline model is constructed, the offline model may be parsed during computation to obtain the computation instruction, which may thereby avoid overhead caused by running an entire software architecture including a deep learning framework.

In some examples, when the input data includes only data to be processed, the following steps may be executed:

step 31: obtaining input data;

step 32: calling a cached computation instruction and performing computation on the data to be processed to obtain a computation result for outputting.

In the above-mentioned example, when the input data includes only data to be processed and does not include neural network structure and weight data, the data to be processed may be computed by calling the computation instruction to obtain a computation result.

In some examples, a neural network processor may perform computation on the data to be processed according to the computation instruction to obtain a computation result. The neural network processor may be mainly used for neural network operations, and may perform computation after receiving instructions, data to be processed, and/or a network model (e.g., an offline model); for instance, for a multi-layer neural network, computation may be performed according to data of an input layer as well as data of neurons, weights, offsets, etc., to obtain data of an output layer.

In a further example, the neural network processor may include an instruction caching unit (cache, buffer, or scratch pad) for writing a received computation instruction.

In some examples, the neural network processor may further include a data caching unit (cache, buffer, or scratch pad) for writing data to be processed. The data to be processed may be input to the neural network processor, temporarily stored in the data caching unit, and later subject to computation according to a computation instruction.

According to the above-mentioned computation method, the example of the present disclosure also provides a computation device including:

an input module configured to acquire input data, where the input data may include data to be processed, a network structure, and weight data, or the input data may include data to be processed and/or offline model data;

a model generation module configured to construct an offline model according to the input network structure and weight data;

a neural network operation module configured to generate a computation instruction and cache the computation instruction according to the offline model data in the input module or the offline model constructed in the model generation module, and compute the data to be processed according to the computation instruction to obtain a computation result;

an output module configured to output the computation result; and a control module configured to detect a type of the input data and execute the following operation:

where the input data includes data to be processed, a network structure, and weight data, controlling the input module to input the network structure and the weight data into the model generation module to construct an offline model, and controlling the neural network operation module to perform computation on the data to be processed input by the input module according to the offline model input by the model generation module;

where the input data includes data to be processed and an offline model, controlling the input module to input the data to be processed and the offline model into the neural network operation module, and controlling the neural network operation module to generate a computation instruction according to the offline model and cache the computation instruction, and to perform computation on the data to be processed according to the computation instruction; and where the input data includes only data to be processed, controlling the input module to input the data to be processed into the neural network operation module, and controlling the neural network operation module to call a cached computation instruction and perform computation on the data to be processed.

The neural network operation module above may include a model parsing unit and a neural network processor, where the model parsing unit may be configured to generate a computation instruction according to an offline model; and the neural network processor may be configured to cache the computation instruction for subsequent computation to call; or call a cached computation instruction in case where only the data to be processed is included in the input data, and perform computation on the data to be processed according to the computation instruction to obtain a computation result.

In some examples, the aforesaid neural network processor may include an instruction caching unit (cache, buffer, or scratch pad) configured to write a computation instruction for subsequent computation to call.

In some examples, the aforesaid offline model may be a text file defined according to a special structure, and may be various neural network models, such as Cambricon_model, AlexNet_model, GoogleNet_model, VGG_model, R-CNN_model, GAN_model, LSTM_model, RNN_model, ResNet_model, but are not limited to these models proposed in this example.

The offline model may include necessary network structure information of respective compute nodes in an original network, such as network weights and instruction data, where the instruction may include the information of computational attributes of the respective compute nodes and connections among the compute nodes, so that the offline model corresponding to the network can be run directly when the original network is run by the processor once again without the need of performing operation such as compiling the same network once again, which may thereby shorten the time when the processor runs the network and improve the processing efficiency of the processor.

Optionally, the processor may be a general-purpose processor, such as a CPU (Central Processing Unit), a GPU (Graphics Processing Unit), or an IPU (Intelligence Processing Unit), and the IPU is a processor used for performing artificial neural network operations.

In some examples, the data to be processed may be input that can be processed by a neural network, such as at least one of continuous single pictures, voice, or video stream.

In some examples, the aforesaid network structure may be various neural network structures, such as Alex Net, Google Net, ResNet, VGG, R-CNN, GAN, LSTM, RNN, ResNet, etc., but are not limited to these structures proposed in this example. It should be noted that the network structure here corresponds to the offline model. For instance, when the network structure is RNN, the offline model may be RNN_model, and this model may include necessary RNN network structure information such as a network weight value and instruction data of each node in the RNN network, where the instruction may include information of computational attributes of respective compute nodes and connections among the compute nodes.

Specifically, depending on different data input by the input module, the computation device of the example of the present disclosure may have the following three forms of execution.

1. Where the data input by the input module is a network structure, weight data and data to be processed, the control module may control the input module to transmit the network structure and the weight data to the model generation module, and transmits the data to be processed to the model parsing unit; the control module may control the model generation module to generate an offline model (the offline model may be a text file defined according to a preset structure, and may include necessary network structure information of respective compute nodes in a neural network such as network weights and instruction data, where the instruction may include information of computational attributes of the respective compute nodes and connections among the compute nodes; for instance, the offline model may be constructed according to a corresponding network structure type and weight data) according to a specific network structure and corresponding weight data, and transmit the generated offline model to the model parsing unit; the control module may control the model parsing unit to parse the received offline model to obtain a computation instruction recognizable by the neural network processor (in other words, to map a corresponding network operation instruction according to the text file of the offline model without performing network compiling operation), and transmit the computation instruction and the data to be processed to the neural network processor; and the neural network processor may perform computation on the data to be processed according to the received computation instruction to obtain a computation result, and transmit the computation result to the output module for output.

2. Where the data input by the input module is an offline model and data to be processed, the control module may control the input module to transmit the offline model and the data to be processed to the model parsing unit directly, and subsequent operation may be the same as the first form.

3. Where the data input by the input module includes only data to be processed, the control module may control the input module to transmit the data to be processed to the neural network processor via the model parsing unit, and the neural network processor may perform computation on the data to be processed according to a cached computation instruction to obtain a computation result. The input module may include a determination module for determining a type of the input data. It can be understood that this form usually does not occur in a first-time use of the neural network processor to ensure that there are certain computation instructions in the instruction caching unit.

Therefore, when an offline model of a current network operation is different from that of a previous network operation, data input by the input module should include a network structure, weight data, and data to be processed, and subsequent network operation may be performed after a new offline model is generated by the model generation module; when a corresponding offline model has been obtained in advance for a current network operation, data input by the input module should include the offline model and data to be processed; when an offline model of a current network operation is the same as that of a previous network operation, data input by the input module may include only data to be processed.

In some examples of the present disclosure, the computation device described in the present disclosure may be integrated as a sub-module into a central processor module of an entire computer system. Data to be processed and an offline model may be transmitted to the computation device under the control of the central processor. The model parsing unit may parse the transmitted neural network offline model and generate a computation instruction. Then, the computation instruction and the data to be processed may be transmitted to the neural network processor to undergo computation processing, to obtain a computation result, where the computation result may be returned to a main storage unit. In a subsequent computation process, the network structure may no longer be changed, so it is merely necessary to continuously transmit the data to be processed to complete a neural network operation, and obtain a computation result.

The computation device and method proposed by the present disclosure will be described in detail below with specific examples.

Figure 2:
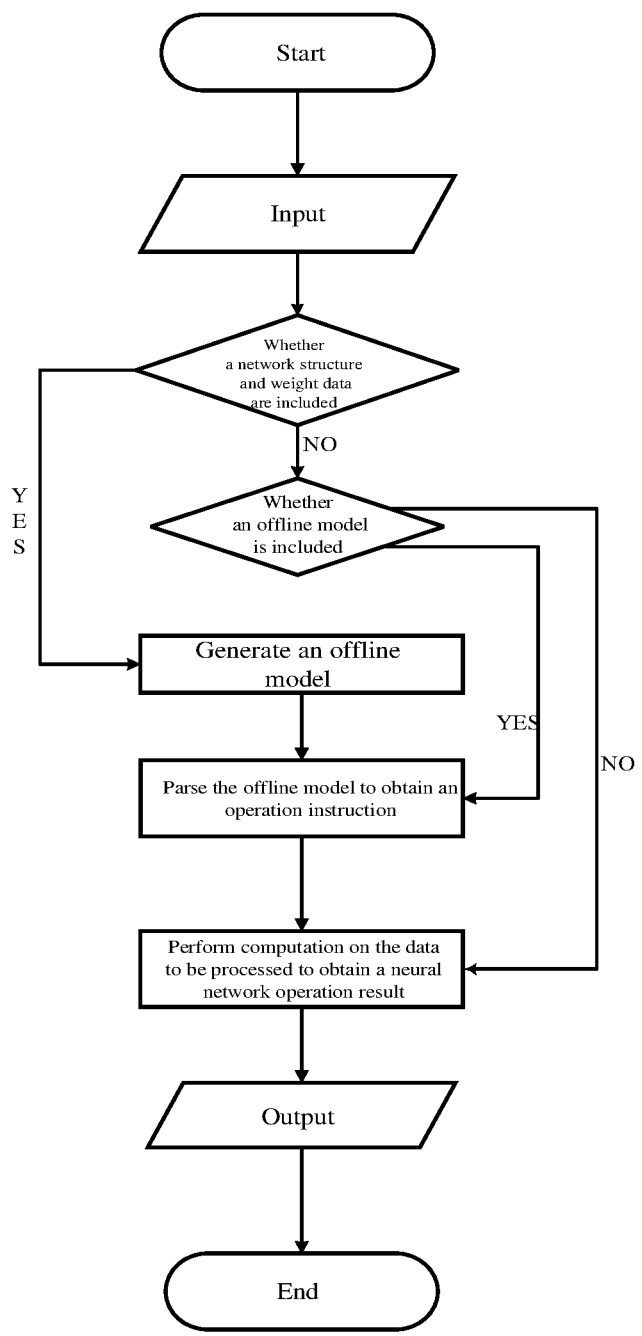
FIG. 2 is a computation flowchart of a computation method according to an example of the present disclosure.

As shown by FIG. 2, an example proposes a computation method including the following steps:

when input data includes data to be processed, a network structure, and weight data, the following steps may be executed:

step 11: obtaining the input data;

step 12: construct an offline model according to the network structure and the weight data;

step 13: parsing the offline model, obtaining a computation instruction, and caching the computation instruction for subsequent computation to call;

step 14: performing computation on the data to be processed according to the computation instruction to obtain a computation result for outputting;

when the input data includes data to be processed and an offline model, the following steps may be executed:

step 21: obtaining the input data;

step 22: parsing the offline model, obtaining a computation instruction and caching the computation instruction for subsequent computation to call;

step 23: performing computation on the data to be processed according to the computation instruction to obtain a computation result for outputting;

when the input data includes only data to be processed, the following steps may be executed:

step 31: obtaining the input data;

step 32: calling a cached computation instruction and performing computation on the data to be processed to obtain a computation result for outputting.

A neural network processor may perform computation on the data to be processed according to the computation instruction to obtain a computation result; the neural network processor may have an instruction caching unit (cache, buffer, or scratch pad) and a data caching unit (cache, buffer, or scratch pad) for writing a received computation instruction and the data to be processed.

A network structure of the input proposed in this example may be AlexNet, the weight data may be bvlc_alexnet.caffemodel, the data to be processed may be continuous single pictures, and the offline model may be Cambricon_model. For an existing offline model, the offline model Cambricon_model can be parsed to generate a series of computation instructions, and then the generated computation instructions may be transmitted to an instruction caching unit on a neural network processor 2707, and an input picture transmitted by an input module 2701 may be transmitted to a data caching unit on the neural network processor 2707.

In conclusion, by using the method proposed in this example, a computation process using the neural network processor may be greatly simplified, and an extra memory and IO overhead incurred by calling a traditional entire programming framework may be avoided. By using this method, a neural network processor may realize full computation performance in a low-memory application environment with strong real-timeness.

Figure 3:
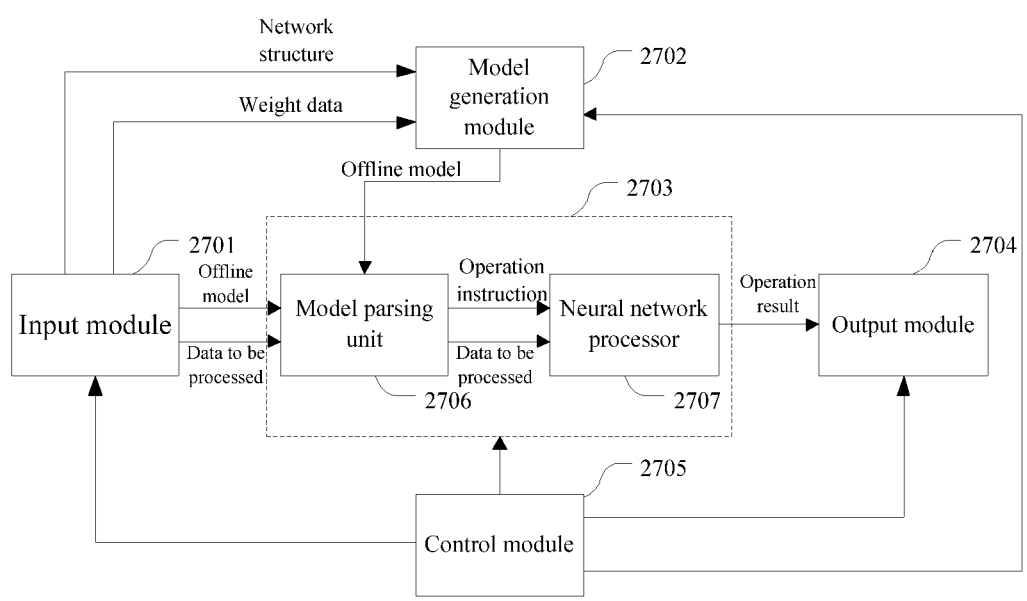
FIG. 3 is a structural block diagram of a computation device according to another example of the present disclosure.

As shown by FIG. 3, this example further provides a computation device including: an input module 2701, a model generation module 2702, a neural network operation module 2703, an output module 2704, and a control module 2705, where the neural network operation module 2703 may include a model parsing unit 2706 and a neural network processor 2707.

A keyword of the device may be offline execution, which means that after an offline model is generated, the offline model may be directly used to generate a relevant computation instruction and weight data is transmitted, to perform computation on data to be processed. More specifically:

The input module 2701 may be configured to input a combination of a network structure, weight data, and data to be processed or a combination of an offline model and data to be processed. When the input is the network structure, the weight data, and the data to be processed, the network structure and weight data may be transmitted to the model generation module 2702 to generate an offline model for performing subsequent computation. When the input is the offline model and the data to be processed, the offline model and the data to be processed may be transmitted to the model parsing unit 2706 directly to perform subsequent computation.

The output module 2704 may be configured to output determined computation data generated according to a specific network structure and a set of data to be processed, where output data may be obtained from computation by the neural network processor 2707.

The model generation module 2702 may be configured to generate an offline model for using by a lower layer according to input network structure parameters and the weight data.

The model parsing unit 2706 may be configured to parse the transmitted-in offline model, generate a computation instruction that can be directly transmitted to the neural network processor 2707, and meanwhile transmit the data to be processed input from the input module 2701 to the neural network processor 2707.

The neural network processor 2707 may be configured to perform computation according to the transmitted-in computation instruction and the data to be processed, and transmit a determined computation result to the output module 2704, and the neural network processor 2707 may include an instruction caching unit and a data caching unit.

The above-mentioned control module 2705 may be configured to detect a type of the input data and execute the following operation:

where the input data includes data to be processed, a network structure, and weight data, controlling the input module 2701 to input the network structure and the weight data into the model generation module 2702 to construct an offline model, and controlling the neural network operation module 2703 to perform neural network operation on the data to be processed input from the input module 2701 according to the offline model input from the model generation module 2702;

where the input data includes data to be processed and an offline model, controlling the input module 2701 to input the data to be processed and the offline model into the neural network operation module 2703, and controlling the neural network operation module 2703 to generate a computation instruction and cache the computation instruction according to the offline model, and to perform neural network operation on the data to be processed according to the computation instruction; and where the input data includes only data to be processed, controlling the input module 2701 to input the data to be processed into the neural network operation module 2703, and controlling the neural network operation module 2703 to call the cached computation instruction and perform neural network operation on the data to be processed.

The input network structure proposed in this example may be AlexNet, the weight data may be bvlc_alexnet.caffemodel, and the data to be processed may be continuous single pictures. The model generation module 2702 may generate a new offline model Cambricon_model according to the input network structure and the weight data. The generated offline model Cambricon_model may be used alone as a next input; the model parsing unit 2706 can parse the offline model Cambricon_model to generate a series of computation instructions. The model parsing unit 2706 may transmit the generated computation instructions to an instruction caching unit (cache, buffer, or scratch pad) on the neural network processor 2707, and transmit an input picture transmitted from an input module 2701 to a data caching unit (cache, buffer, or scratch pad) on the neural network processor 2707.

Some examples further disclose a chip, which may include the aforesaid processing device.

Some examples further disclose a chip package structure, which may include the aforesaid chip.

Some examples further disclose a board card, which may include the aforesaid chip package structure.

An example further discloses electronic apparatus, which may include the aforesaid board card.

The electronic apparatus may include, but is not limited to, robots, computers, printers, scanners, tablets, smart terminals, mobile phones, driving recorders, navigators, sensors, webcams, cloud servers, cameras, video cameras, projectors, watches, headphones, mobile storage, wearable apparatuses, vehicles, household appliances, and/or medical equipment.

The vehicles may include airplanes, ships, and/or cars; the household appliances may include televisions, air conditioners, microwave ovens, refrigerators, rice cookers, humidifiers, washing machines, electric lamps, gas stoves, and range hoods; the medical equipment may include nuclear magnetic resonance instruments, B-ultrasound instruments, and/or electrocardiographs.

In the examples provided by the present disclosure, it should be understood that the related device and method disclosed may be implemented in other manners. For instance, the device examples described above are merely illustrative. For instance, the division of the part or module is only a logical function division. In actual implementation, there may be another division manner, for instance, multiple parts or modules may be combined or may be integrated into one system, or some features can be ignored or not executed.

In the present disclosure, the term "and/or" may have been used. As used herein, the term "and/or" means one or the other or both (e.g., the phrase "A and/or B" means "A or B", or "both A and B").

In the above description, for purposes of explanation, numerous specific details are set forth in order to provide a thorough understanding of various examples of the present disclosure. However, it will be obvious for a person skilled in the art that one or more other examples can also be implemented without some of these specific details. The specific examples described are not intended to limit the present disclosure but to illustrate it. The scope of the present disclosure is not to be determined by the specific examples provided above but only by the following claims. In other instances, known circuits, structures, apparatuses, and operations are shown not in detail but in block diagrams so as not to obscure the understanding of the description. Where deemed appropriate, the reference numerals or the end portions of the reference numerals are repeated among the drawings to indicate corresponding or similar elements optionally having similar characteristics or the same features, unless specified or obvious otherwise.

Various operations and methods have been described. Some methods have been described by way of flow chart in a relatively basic manner, but these operations can optionally be added to and/or removed from these methods. In addition, although the flowchart shows specific sequences of operations according to various exemplary examples, it is to be understood that the specific sequences are exemplary. Alternative examples may optionally perform these operations in different ways, combine certain operations, interlace some operations, etc. The modules, features, and specific optional details of the devices described herein may also optionally be applied to the methods described herein. In various examples, these methods may be executed by and/or executed within such devices.

In the present disclosure, respective functional parts/units/sub-units/modules/sub-modules/means may be hardware. For instance, the hardware may be a circuit including a digital circuit, an analog circuit, and the like. Physical implementation of hardware structures may include, but is not limited to, physical devices, and the physical devices may include but are not limited to transistors, memristors, and the like. The computation module in the computation device may be any suitable hardware processor such as a CPU, GPU, FPGA, DSP, ASIC, etc. The storage unit may be any suitable magnetic storage medium or magneto-optical storage medium such as RRAM, DRAM, SRAM, EDRAM, HBM, HMC, etc.

Persons skilled in the art can clearly understand that for convenience and conciseness of description, the division of the above-mentioned functional modules is illustrated only as instances, and in practical application, the above-mentioned functions can be assigned to different functional modules to complete according to the needs. In other words, the internal structure of the device can be divided into different functional modules to complete all or a part of the functions described above.

The specific examples described above further explain the purpose, technical solution, and technical effects of the present disclosure in detail. It should be understood that the above description only relates to specific examples of the present disclosure and is not intended to limit the present disclosure, and any modifications, equivalent substitutions, improvements, etc. made within the spirit and principles of the present disclosure should all be included within the scope of protection of the present disclosure.

What is claimed is:

1. A computation device comprising:
an input circuit configured to acquire input data, wherein the input data includes data to be processed;
a model generation circuit configured to construct an offline model according to the input data;
a neural network operation circuit configured to:
determine a computation instruction based on the offline model,
cache the computation instruction, and
compute the data to be processed according to the computation instruction to obtain a computation result; and
a model parsing circuit configured to generate the computation instruction according to the offline model; and
a neural network processor configured to cache the computation instruction for subsequent computation, or retrieve a cached computation instruction based on a determination that the input data only includes the data to be processed, and perform computation on the data to be processed according to the computation instruction to obtain the computation result.

2. The computation device of claim 1, wherein the input data includes offline model data.

3. The computation device of claim 1, wherein,
the input data includes a network structure, and weight data.

4. The computation device of claim 3, wherein, the network structure is a neural network structure including at least one of the following:
AlexNet, GoogleNet, ResNet, VGG, R-CNN, GAN, LSTM, RNN, and ResNe.

5. The computation device of claim 1, further comprising:
a control circuit configured to determine content of the input data,
wherein, based on a determination that the input data includes a network structure and weight data, the control circuit is configured to:
instruct the input circuit to transmit the network structure and the weight data in the input data to the model generation circuit,
instruct the model generation circuit to generate the offline model based on the weight data and the network structure,
control the neural network operation circuit to compute the data to be processed based on the generated offline model,
wherein, based on a determination that the input data includes the offline model, the control circuit is configured to:
instruct the input circuit to transmit the data to be processed and the offline model to the neural network operation circuit,
control the neural network operation circuit to generate the computation instruction based on the offline model and cache the computation instruction,
instruct the neural network operation circuit to compute the data to be processed based on the computation instruction, and
wherein, based on a determination that the input data only includes the data to be processed, the control circuit is configured to:
instruct the input circuit to transmit the data to be processed to the neural network operation circuit,
instruct the neural network operation circuit to retrieve a cached computation instruction and to compute the data to be processed based on the computation instruction.

6. The computation device of claim 1, wherein, the neural network operation circuit further includes:
an instruction caching circuit configured to write the computation instruction for the neural network processor to retrieve, and
a data caching circuit configured to write the input data.

7. The computation device of claim 1, wherein, the offline model is a neural network model including at least one of the following:

Cambricon_model, AlexNet_model, GoogleNet_model, VGG_model, R-CNN_model, GAN_model, LSTM_model, RNN_model, and ResNet_model.

8. A neural network computation method, comprising:

acquiring, by an input circuit, input data that includes data to be processed;

determining, by a model generation circuit, an offline model according to the input data;

determining, by a neural network operation circuit, a computation instruction according to the offline model for subsequent computation to call;

calling, by the neural network operation circuit, the computation instruction;

computing, by the neural network operation circuit, the data to be processed;

generating, by a model parsing circuit, the computation instruction according to the offline model;

caching, by a neural network processor, the computation instruction for subsequent computation, or retrieving, by the neural network processor, a cached computation instruction based on a determination that the input data only includes the data to be processed;

performing, by the neural network processor, computation on the data to be processed according to the computation instruction to obtain the computation result.

9. The method of claim 8, wherein the input data includes a network structure and weight data.

10. The method of claim 9, wherein when the input data includes a network structure and weight data, the determining an offline model according to the input data includes:

constructing the offline model according to the network structure and the weight data.

11. The method of claim 9, wherein, the network structure is a neural network structure including at least one of the following:

AlexNet, GoogleNet, ResNet, VGG, R-CNN, GAN, LSTM, RNN, and ResNe.

12. The method of claim 8, wherein the input data includes offline model data.

13. The method of claim 8, wherein the calling the computation instruction includes:

performing network operations according to the computation instruction based on a determination that the input data only includes the data to be processed and does not include an offline model, or performing network operations according to the computation instruction based on a determination that the offline model is determined.

14. The method of claim 8, wherein, the offline model is a neural network model, and the neural network model includes at least one of the following:

Cambricon_model, AlexNet_model, GoogleNet_model, VGG_model, R-CNN_model, GAN_model, LSTM_model, RNN_model, and ResNet_model.

* * * * *